United States Patent
Li et al.

(10) Patent No.: US 9,072,129 B2
(45) Date of Patent: Jun. 30, 2015

(54) LCD BACKLIGHT MODULE AND METHOD FOR CONTROLLING THE SAME

(75) Inventors: Fei Li, Shenzhen (CN); Xinming Gao, Shenzhen (CN); Xiang Yang, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/522,962

(22) PCT Filed: May 25, 2012

(86) PCT No.: PCT/CN2012/076055
§ 371 (c)(1),
(2), (4) Date: Jul. 19, 2012

(87) PCT Pub. No.: WO2013/166756
PCT Pub. Date: Nov. 14, 2013

(65) Prior Publication Data
US 2015/0069927 A1   Mar. 12, 2015

(51) Int. Cl.
*H05B 33/08* (2006.01)
*H05B 37/02* (2006.01)
*G09G 3/34* (2006.01)

(52) U.S. Cl.
CPC .......... *H05B 37/0209* (2013.01); *G09G 3/3406* (2013.01); *G09G 2320/0247* (2013.01); *G09G 2320/0653* (2013.01); *G09G 2330/026* (2013.01); *G09G 2330/027* (2013.01)

(58) Field of Classification Search
USPC ........................... 315/307, 308, 224; 345/102
See application file for complete search history.

(56) References Cited

U.S. PATENT DOCUMENTS

2004/0252096 A1 *  12/2004  Wang et al. ................... 345/102

* cited by examiner

*Primary Examiner* — David H Vu
(74) *Attorney, Agent, or Firm* — Mark M. Friedman

(57) ABSTRACT

The present invention discloses an LCD backlight module, which includes a backlight source and a backlight source control device, the backlight source control device comprising: a first switch; a boost module; a control module, utilized to control the first switch, so that the backlight source is switched on off under the control of the control module, and utilized to control the boost module, so that the boost module keeps outputting the voltage after the backlight source is turned off by the first switch.

10 Claims, 3 Drawing Sheets

… (1) …

LCD BACKLIGHT MODULE AND METHOD FOR CONTROLLING THE SAME

FIELD OF THE INVENTION

The present invention relates to a liquid crystal display (LCD) panel technology, and especially to an LCD backlight module and a method for controlling the same.

BACKGROUND OF THE INVENTION

A conventional LCD panel includes a backlight module, a thin-film transistor (TFT) panel, and so on. The backlight module, an important component, is used for providing a stable light source for the TFT panel, so that images provided by the TFT panel can be shown steadily. The traditional LCD backlight module includes a backlight source and a backlight source control device. The backlight source control device is used for controlling the backlight source on and off, i.e. controlling a start-up and shutdown of the LCD backlight module. After the traditional LCD backlight module is shut down, an output for boosting the backlight source also stops. Meanwhile, internal circuits of the LCD backlight module still retain electric charges in a certain time.

While a user uses the LCD panel, the user sometimes shuts down the LCD panel and then rapidly starts up. When the LCD backlight module is shut down and then rapidly started up, electrolytic capacitors in the internal circuits still retains the electric charges although the LCD backlight module has been shut down. The electric charges can not be release in a short time, and the existence of the electric charges makes the LCD backlight module occur an abnormal phenomenon, i.e. flickering phenomenon when shutting down and then rapidly starting up. The flickering phenomenon causes that the light source, which the backlight module provides for the TFT panel, is unstable, and the useful life of the LCD backlight module is also reduced. Thus, it affects the correct display of the images of the LCD panel, and it is a disadvantage to an enhancement of display quality of the LCD panel.

SUMMARY OF THE INVENTION

An objective of the present invention is to provide an LCD backlight module which can prevent the LCD backlight module form the flickering phenomenon occurring when rapidly shutting down and starting up, and it is an advantage to the enhancement of the display quality of the LCD panel.

To achieve the foregoing objective, the present invention provides an LCD backlight module, which includes a backlight source and a backlight source control device. The backlight source control device includes: a first switch, utilized to control the backlight source on and off; a boost module, utilized to output a voltage to the backlight source; a control module, electrically coupled to the first switch and the boost module, utilized to control the first switch, so that the backlight source is switched on and off under the control of the control module, and utilized to control the boost module, so that the boost module keeps outputting the voltage after the backlight source is turned off by the first switch. The control module is further utilized to receive a backlight ON signal, and to control the boost module according to a high or low level of the backlight ON signal. The control module is further utilized to control the boost module to output the voltage to the backlight source while the backlight ON signal is in the low level. The control module is further utilized to control the boost module to keep outputting the voltage to the backlight source in a predetermined time after the backlight source is turned off by the first switch.

In the above-mentioned LCD backlight module, the control module is further utilized to determine a difference between a present time and a turn-off time of the backlight source after the backlight source is turned off.

In the above-mentioned LCD backlight module, the control module is further utilized to control the boost module to decrease the voltage to the backlight source if the difference is larger than the predetermined time.

In the above-mentioned LCD backlight module, a value of the decreased voltage is linear or nonlinear relative to time while the boost module decreases the voltage to the backlight source.

In the above-mentioned LCD backlight module, the control module is further utilized to control the boost module to keep outputting the voltage to the backlight source if the difference is less than the predetermined time.

Another objective of the present invention is to provide an LCD backlight module, which can prevent the LCD backlight module form the flickering phenomenon occurring when rapidly shutting down and starting up, and it is an advantage to an enhancement of the display quality of the LCD panel.

To achieve the foregoing objective, the present invention provides an LCD backlight module, which includes a backlight source and a backlight source control device. The backlight source control device includes: a first switch, utilized to control the backlight source on and off; a boost module, utilized to output a voltage to the backlight source; a control module, electrically coupled to the first switch and the boost module, utilized to control the first switch, so that the backlight source is switched on and off under the control of the control module, and utilized to control the boost module, so that the boost module keeps outputting the voltage after the backlight source is turned off by the first switch.

In the above-mentioned LCD backlight module, the control module is further utilized to receive a backlight ON signal, and controls the boost module according to a high or low level of the backlight ON signal.

In the above-mentioned LCD backlight module, the control module is further utilized to control the boost module to output the voltage to the backlight source while the backlight ON signal is in the low level.

In the above-mentioned LCD backlight module, the control module further utilized to control the boost module to keep outputting the voltage to the backlight source in a predetermined time after the backlight source is turned off by the first switch.

In the above-mentioned LCD backlight module, the control module is further utilized to determine a difference between a present time and a turn-off time of the backlight source after the backlight source is turned off, and utilized to control the boost module to decrease the voltage to the backlight source if the difference is larger than the predetermined time, and to keep outputting the voltage to the backlight source if the difference is less than the predetermined time.

Yet another objective of the present invention is to provide a method for controlling an LCD backlight module, which can prevent the LCD backlight module form the flickering phenomenon occurring when rapidly shutting down and starting up, and it is an advantage to an enhancement of the display quality of the LCD panel.

To achieve the foregoing objective, the present invention provides a method for controlling an LCD backlight module. The LCD backlight module includes a backlight source and a backlight source control device. The LCD backlight module further includes a first switch, a boost module, and a control module, and the control module electrically is coupled to the first switch and the boost module. The method includes the following steps of: (A) controlling the backlight source on and off by the first switch; (B) outputting a voltage to the backlight source by the boost module; (C) controlling the first switch by the control module, so that the backlight source is switched on and off under the control of the control module, and controlling the boost module, so that the boost module keeps outputting the voltage after the backlight source is turned off by the first switch.

In the above-mentioned method for controlling the LCD backlight module, the step (C) further includes the following step of: (c1) receiving a backlight ON signal by the control module, and controlling the boost module according to a high or low level of the backlight ON signal.

In the above-mentioned method for controlling the LCD backlight module, the step (c1) further includes the following step of: (c12) controlling the boost module to output the voltage to the backlight source by the control module while the backlight ON signal is in the low level.

In the above-mentioned method for controlling the LCD backlight module, the step (C) further includes the following step of: (c2) controlling the boost module to keep outputting the voltage to the backlight source in a predetermined time by the control module after the backlight source is turned off by the first switch.

In the above-mentioned method for controlling the LCD backlight module, the step (c2) further includes the following step of: (c21) determining a difference between a present time and a turn-off time of the backlight source by the control module after the backlight source is turned off, and utilized to control the boost module to decrease the voltage to the backlight source if the difference is larger than the predetermined time, and to keep outputting the voltage to the backlight source if the difference is less than the predetermined time.

In comparison with the prior art, because the control module of the present invention still control the boost module to output the voltage to the backlight source in a state of the backlight source off, the flickering phenomenon dose not occur when the LCD backlight module is started up. Accordingly, it is an advantage to an enhancement of the display quality of the LCD panel.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
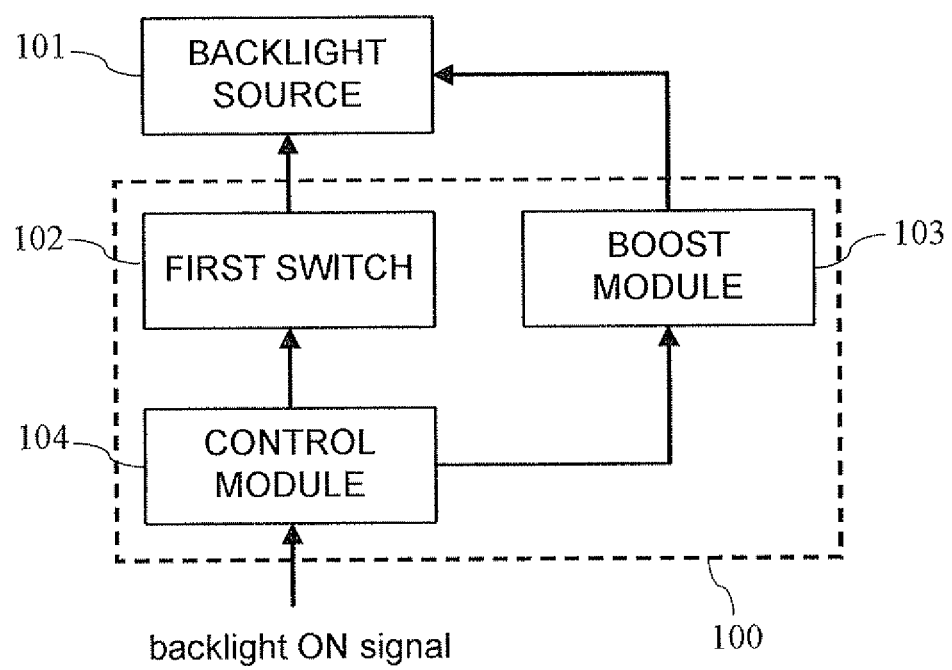
FIG. 1 is a block diagram illustrating an LCD backlight module of the present invention.

Referring to FIG. 1, FIG. 1 is a block diagram illustrating an LCD backlight module of the present invention. The LCD backlight module of the present invention includes a backlight source 101 and a backlight source control device 100. The backlight source 101 can be light-emitting diode (LED) lamps or cold cathode fluorescent lamp (CCFL). The backlight source control device 100 includes a boost module 103, a first switch 102, and a control module 104. Both The first switch 102 and the boost module 103 are electrically coupled to the backlight source 101. The control module 104 is electrically coupled to the first switch 102 and the boost module 103. Certainly, the control module 104 can be electrically coupled to the backlight source 101, and determine whether the backlight source 101 has been turned off by detecting a voltage of a connection between the control module 104 and the backlight source 101. The control module 104 is utilized to receive a backlight ON (BLON) signal and then to determine which operation needs to be performed by the LCD backlight module in present time according to the backlight ON signal. The control module 104 is further utilized to control the boost module 103 according to the determined result, for making the boost module 103 keep or stop outputting the voltage to backlight source 101. If the operation performed by the LCD backlight module in the present time is to turn on the backlight source 101 (the backlight ON signal is at a high level), the control module 104 controls the first switch 102 to turn on the backlight source 101. If the operation performed by the LCD backlight module in the present time is to turn off the backlight source 101 (the backlight ON signal is at a low level), the control module 104 controls the first switch 102 to turn off the backlight source 101. Meanwhile, a driving signal is transmitted from the control module 104 into the boost module 103, so that the boost module 103 maintains the normal voltage output. That is, the boost module 103 keeps outputting the normal voltage to the backlight source 101. In actual implementation, the boost module 103 can also output a voltage (with a variation of +/−30%) with an approximately normal value of the voltage to the backlight source 101.

The technical solution provide by the present invention is to overcome the problem of the flickering phenomenon occurring when rapidly shutting down and starting up in the LCD backlight module. After the control module 104 of the LCD panel receives the backlight ON signal with the low level, a voltage is output by the boost module 103 so as to maintain the normal operation of the backlight source 101, thereby preventing the LCD backlight module form the flickering phenomenon occurring when rapidly shutting down and starting up. In actual implementation, for security and stability, the control module 104 of the LCD backlight module of the present invention controls the boost module 103 to keep outputting the voltage to the backlight source 101 in a predetermined time after the backlight source 101 is turned off by the first switch 102.

Specifically, the control module 103 calculates a difference between the present time and a last turn-off time of the backlight source 10. If the difference is larger than the predetermined time (e.g. 10 seconds), the control module 104 controls the boost module 103 to discontinue outputting the normal voltage to the backlight source 101, or the control module 104 controls the boost module 103 to decrease the output voltage for the backlight source 101 until it goes to zero. If the difference is less than the predetermined time, the control module 104 controls the boost module 103 to keep outputting the voltage to the backlight source 101. A value of the decreased voltage, which is output from the boost module 103 to the backlight source 101, is linear or nonlinear relative to the time in the decreasing process; furthermore, the value decreases by stages, or decreases to zero at a time. Because the boost module 103 still keeps outputting the voltage to the backlight source 101 in a state of the backlight source 101 off, the flickering dose not occur abruptly when the LCD backlight module is shut down and then started up suddenly.

For actually implementing the technical solution of the present invention, the control module 104 is electrically coupled to the backlight source 101, and determines whether the backlight source 101 has been turned off by detecting the voltage of the connection between the control module 104 and the backlight source 101.

Figure 2:
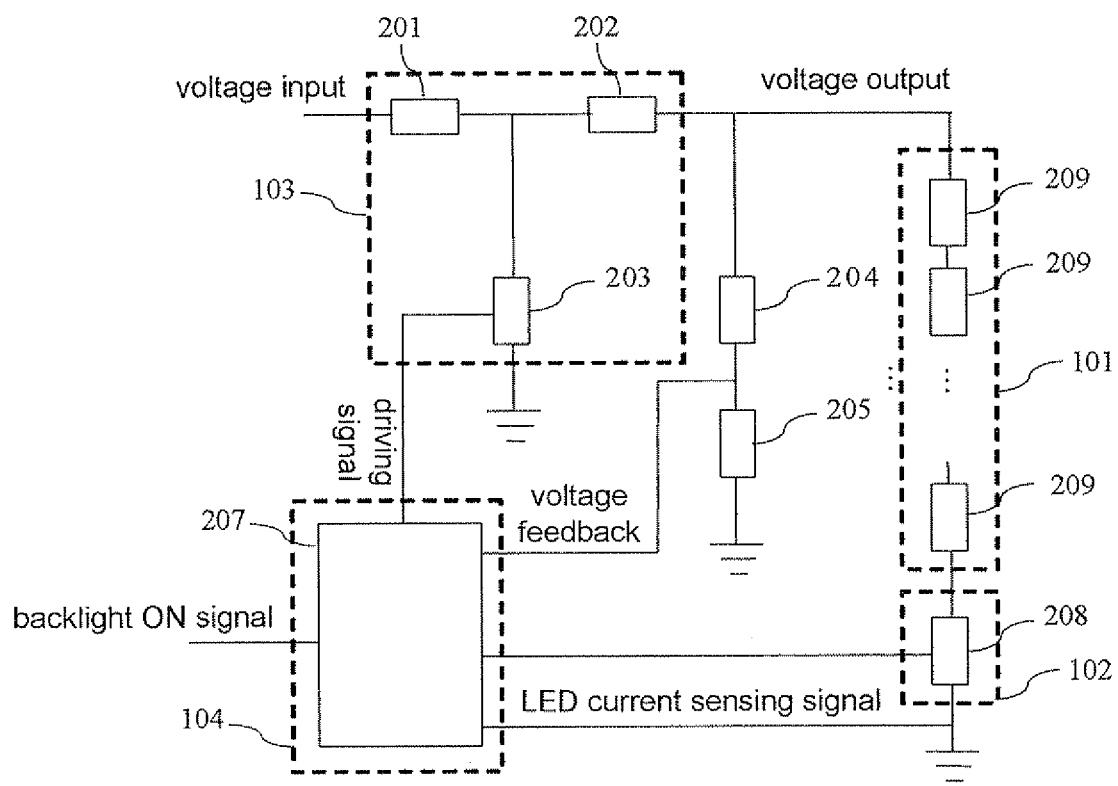
FIG. 2 is a block diagram illustrating a circuit of the LCD backlight module of the present invention.

Referring to FIG. 2, FIG. 2 is a block diagram illustrating a circuit of the LCD backlight module of the present invention. In the drawing, the backlight source 101 includes a plurality of LED lamps 209. The control module 104 is a chip 207. The first switch 102 is a first thin-film transistor 208. The boost module 103 includes an inductor 201, a diode 202, and a second thin-film transistor 203. The chip 207 receives the backlight ON signal. When the backlight ON signal received by the chip 207 is a low level signal (to assume that the low level signal represents to turn off the LED lamps 209), the chip 207 controls the first thin-film transistor 208 for making the LED lamps 209 off. Meanwhile, the chip 207 will receive an LED current sensing signal; that is, the chip 207 learns that the LED lamps 209 have been turned off. The chip 207 switches to a voltage feedback; that is, the chip 207 opens a port coupled between a first resistor 204 and a second resistor 205. The chip 207 outputs a driving signal through a divided voltage by the first resistor 204 and the second resistor 205. The driving signal will be transmitted to the second thin-film transistor 203, so that the second thin-film transistor 203 is turned on (conducted), and then the inductor 201 outputs the voltage to the diode 202. A conductive direction of the diode 202 is one way from the inductor 201 to the backlight source 101. The inductor 201 and the diode 202 keep outputting the normal voltage to the LED lamps 209.

Figure 3:
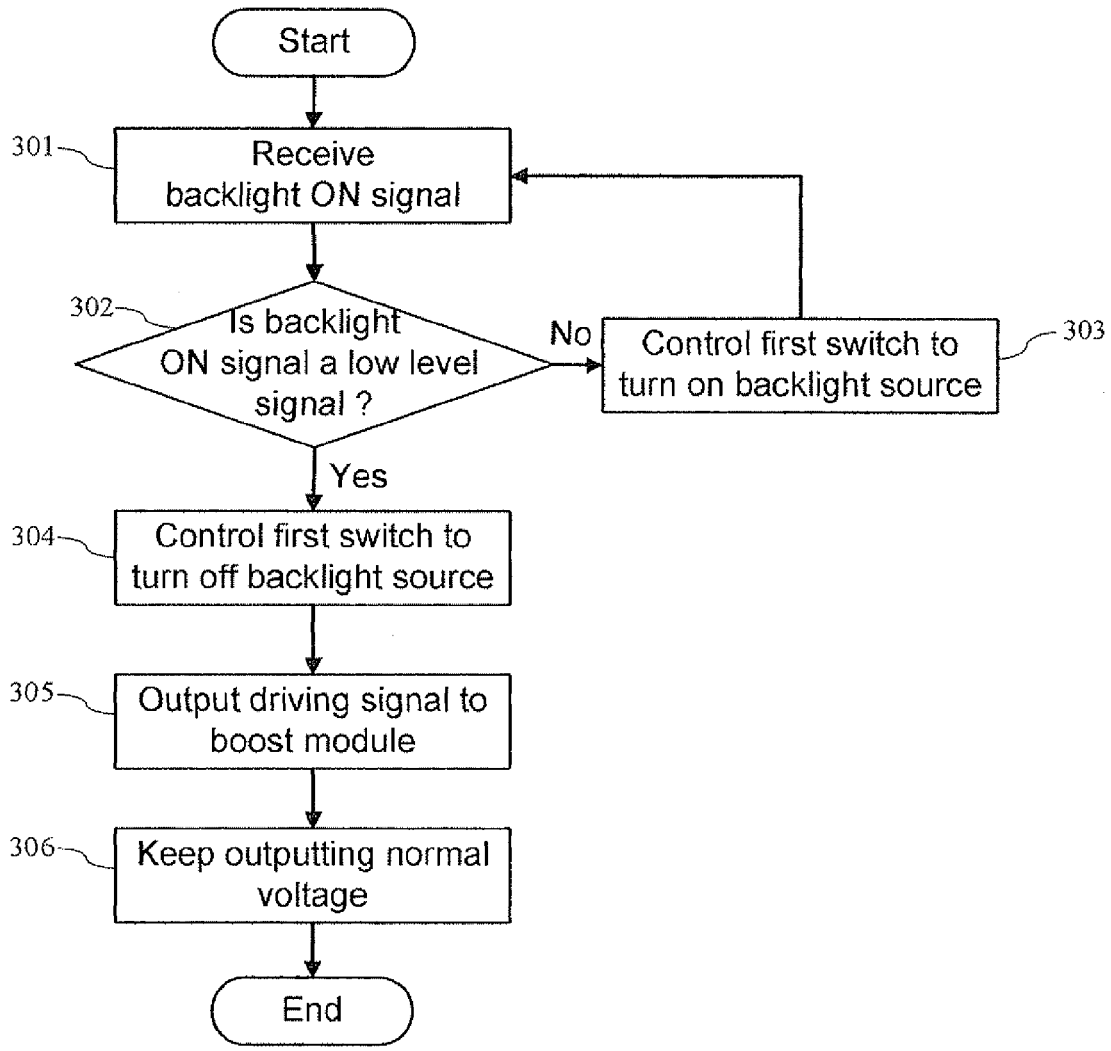
FIG. 3 is a flow chart illustrating a method for controlling an LCD backlight module according to the present invention.

Referring to FIG. 3, FIG. 3 is a flow chart illustrating a method for controlling an LCD backlight module according to the present invention. At step 301, the control module 104 receives the backlight ON signal. At step 302, the control module 104 determines which operation, such as turning on or turning off the backlight source 101, needs to be performed by the LCD backlight module in the present time according to the backlight ON signal. The control module 104 determines that in accordance with the backlight ON signal being the high level signal or the low level signal. If the operation performed by the LCD backlight module in the present time is to turn on the backlight source 101, the control module 104 controls the first switch 102 to turn on the backlight source 101 at step 303. At step 303, the control module 104 is waiting to receive the backlight ON signal. If the operation performed by the LCD backlight module in the present time is to turn off the backlight source 101, the control module 104 controls the first switch 102 to turn off the backlight source 101 at step 304. The control module 104 can be electrically coupled to the backlight source 101, and determine whether the backlight source 101 has been turned off by detecting a voltage of a connection between the control module 104 and the backlight source 101. At step 305, the control module 104 outputs the driving signal to the boost module 103, which is used for controlling the boost module 103 to keep or stop outputting the voltage to backlight source 101. At step 306, the boost module 103 keeps outputting the normal voltage to the backlight source 101.

The technical solution of this invention is implemented as follows. The control module 104 controls the boost module 103 to keep outputting the voltage to the backlight source 101 after the backlight source 101 is turned off by the first switch 102. In the actual implementation, for security and stability, the control module 104 of the LCD backlight module of the present invention controls the boost module 103 to keep outputting the voltage to the backlight source 101 in a predetermined time after the backlight source 101 is turned off by the first switch 102.

Specifically, after controlling the first switch 102 to turn off the backlight source 101, the control module 104 further measures the difference between the present time and the last turn-off time of the backlight source 10. If the difference is larger than the predetermined time, the boost module 103 is controlled to discontinue outputting the voltage to the backlight source 101, or the boost module 103 gradually decreases the output voltage for the backlight source 101 until it goes to zero. If the difference is less than the predetermined time, the control module 104 controls the boost module 103 to keep outputting the voltage to the backlight source 101. A value of the decreased voltage, which is output from the boost module 103 to the backlight source 101, is linear or nonlinear relative to the time in the decreasing process; furthermore, the value decreases by stages, or decreases to zero at a time.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An LCD backlight module, comprising:
   a backlight source; and
   a backlight source control device;
   the backlight source control device comprising:
      a first switch, utilized to control the backlight source on and off;
      a boost module, utilized to output a voltage to the backlight source; and
      a control module, electrically coupled to the first switch and the boost module, utilized to control the first switch, so that the backlight source is switched on and off under the control of the control module, and utilized to control the boost module, so that the boost module keeps outputting the voltage after the backlight source is turned off by the first switch;
      wherein the control module is further utilized to receive a backlight ON signal, and to control the boost module according to a high or low level of the backlight ON signal;
      wherein the control module is further utilized to control the boost module to output the voltage to the backlight source while the backlight ON signal is in the low level;
      wherein the control module is further utilized to control the boost module to keep outputting the voltage to the backlight source in a predetermined time after the backlight source is turned off by the first switch;
      wherein the control module is further utilized to determine a difference between a present time and a turn-off time of the backlight source after the backlight source is turned off.

2. The LCD backlight module according to claim 1, wherein the control module is further utilized to control the boost module to decrease the output voltage for the backlight source if the difference is larger than the predetermined time.

3. The LCD backlight module according to claim 2, wherein a value of the decreased voltage is linear or nonlinear relative to time while the boost module decreases the voltage to the backlight source.

4. The LCD backlight module according to claim 1, wherein the control module is further utilized to control the boost module to keep outputting the voltage to the backlight source if the difference is less than the predetermined time.

5. An LCD backlight module, comprising a backlight source and a backlight source control device, wherein the backlight source control device comprises:
- a first switch, utilized to control the backlight source on and off;
- a boost module, utilized to output a voltage to the backlight source;
- a control module, electrically coupled to the first switch and the boost module, utilized to control the first switch, so that the backlight source is switched on and off under the control of the control module, and utilized to control the boost module, so that the boost module keeps outputting the voltage after the backlight source is turned off by the first switch;
- wherein the control module is further utilized to control the boost module to keep outputting the voltage to the backlight source in a predetermined time after the backlight source is turned off by the first switch;
- wherein the control module is further utilized to determine a difference between a present time and a turn-off time of the backlight source after the backlight source is turned off, and utilized to control the boost module to decrease the voltage to the backlight source if the difference is larger than the predetermined time, and to keep outputting the voltage to the backlight source if the difference is less than the predetermined time.

6. The LCD backlight module according to claim 5, wherein the control module is further utilized to receive a backlight ON signal, and controls the boost module according to a high or low level of the backlight ON signal.

7. The LCD backlight module according to claim 6, wherein the control module is further utilized to control the boost module to output the voltage to the backlight source while the backlight ON signal is in the low level.

8. A method for controlling an LCD backlight module, the backlight module comprising a backlight source and a backlight source control device, wherein the backlight module further comprises a first switch, a boost module, and a control module, the control module electrically coupled to the first switch and the boost module, the method comprising the following steps of:
- (A) controlling the backlight source on and off by the first switch;
- (B) outputting a voltage to the backlight source by the boost module;
- (C) controlling the first switch by the control module, so that the backlight source is switched on and off under the control of the control module, and controlling the boost module, so that the boost module keeps outputting the voltage after the backlight source is turned off by the first switch, wherein the step (C) further comprises the following step of: (c2) controlling the boost module to keep outputting the voltage to the backlight source in a predetermined time by the control module after the backlight source is turned off by the first switch, wherein the step (c2) further comprises the following step of: (c21) determining a difference between a present time and a turn-off time of the backlight source by the control module after the backlight source is turned off, and controlling the boost module to decrease the voltage to the backlight source if the difference is larger than the predetermined time, and to keep outputting the voltage to the backlight source if the difference is less than the predetermined time.

9. The method according to claim 8, wherein the step (C) further comprises the following step of:
- (c1) receiving a backlight ON signal by the control module, and controlling the boost module according to a high or low level of the backlight ON signal.

10. The method according to claim 9, wherein the step (c1) further comprises the following step of:
- (c12) controlling the boost module to output the voltage to the backlight source by the control module while the backlight ON signal is in the low level.

\* \* \* \* \*